United States Patent
Morin et al.

[11] Patent Number: 5,825,977
[45] Date of Patent: Oct. 20, 1998

[54] WORD HYPOTHESIZER BASED ON RELIABLY DETECTED PHONEME SIMILARITY REGIONS

[76] Inventors: Philippe R. Morin, 3449 Richland Dr., Apt. 8, Santa Barbara, Calif. 93105; Ted H. Applebaum, 84 Lassen Dr., Santa Barbara, Calif. 93111

[21] Appl. No.: 526,718

[22] Filed: Sep. 8, 1995

[51] Int. Cl.[6] .............................. G10L 5/06; G10L 9/00
[52] U.S. Cl. .................... 395/2.64; 395/2.6; 395/2.63; 395/2.5
[58] Field of Search ........................... 395/2.64, 2.6–2.63, 395/2.48, 2.52, 2.5, 2.51, 2.55

[56] References Cited

U.S. PATENT DOCUMENTS

| | | | |
|---|---|---|---|
| 3,770,892 | 11/1973 | Clapper | 395/2.6 |
| 4,481,593 | 11/1984 | Bahler | 395/2.62 |
| 4,489,434 | 12/1984 | Moshier | 395/2.48 |
| 4,489,435 | 12/1984 | Moshier | 395/2.53 |
| 4,528,688 | 7/1985 | Ichikawa et al. | 395/2.48 |
| 4,559,602 | 12/1985 | Bates, Jr. | 395/2.09 |
| 4,718,094 | 1/1988 | Bahl et al. | 395/2.65 |
| 4,723,290 | 2/1988 | Watanabe et al. | 395/2.63 |
| 4,742,547 | 5/1988 | Watanabe | 395/2.5 |
| 4,748,670 | 5/1988 | Bahl et al. | 395/2.65 |
| 4,780,906 | 10/1988 | Rajasekaran et al. | 395/2.6 |
| 4,803,729 | 2/1989 | Baker | 395/2.5 |
| 4,820,059 | 4/1989 | Miller et al. | 395/2.3 |
| 4,905,287 | 2/1990 | Segawa | 395/2.63 |
| 4,908,865 | 3/1990 | Doddington et al. | 395/2.5 |
| 4,924,518 | 5/1990 | Ukita | 395/2.48 |
| 4,937,871 | 6/1990 | Hattori | 395/2.42 |
| 4,987,596 | 1/1991 | Ukita | 395/2.48 |
| 5,027,408 | 6/1991 | Kroeker et al. | 395/2.63 |
| 5,129,001 | 7/1992 | Bahl et al. | 395/2.6 |
| 5,131,043 | 7/1992 | Fujii et al. | 395/2.63 |
| 5,195,167 | 3/1993 | Bahl et al. | 395/2.09 |
| 5,195,168 | 3/1993 | Yong | 395/2.09 |
| 5,197,113 | 3/1993 | Mumolo | 395/2.09 |
| 5,218,668 | 6/1993 | Higgins et al. | 395/2.09 |
| 5,233,681 | 8/1993 | Bahl et al. | 395/2.09 |
| 5,241,619 | 8/1993 | Schwartz et al. | 395/2.09 |
| 5,268,990 | 12/1993 | Cohen et al. | 395/2.09 |
| 5,309,547 | 5/1994 | Niyada et al. | 395/2.47 |
| 5,345,536 | 9/1994 | Hoshimi et al. | 395/2.52 |
| 5,349,645 | 9/1994 | Zhao | 395/2.52 |
| 5,369,727 | 11/1994 | Nomura et al. | 395/2.61 |
| 5,369,728 | 11/1994 | Kosaka et al. | 395/2.63 |
| 5,390,278 | 2/1995 | Gupta et al. | 395/2.52 |

OTHER PUBLICATIONS

Ronald Cole, Krist Roginski and Mark Fanty, "English Alphabet Recognition With Telephone Speech".

Climent Nadeu and Biing–Hwang Juang, "Filtering of Spectral Parameters for Speech Recognition", pp. S31–24.1–S31–24.3, 1994.

Cole, Fanty, Gopalakrishnan and Janssen, "Speaker–Independent Name Retrieval From Spellings Using a Database of 50,000 Names", pp. 325–328, 1991.

Philippe Morin, Jean–claude Junqua, "Habitable Interaction in Goal–Oriented Multimodal Dialogue Systems", pp. 1669–1672.

Hoshimi, Miyata, Kiroaka and Niyada, "Speaker Independent Speech Recognition Method Using Training Speech From a Small Number of Speakers", pp. I–469–I–472, 1992.

Yifan Gong and Jean–Paul Haton, "Plausibility functions in continuous speech recognition: The VINICS system", pp. 187–195, 1993.

Primary Examiner—Allen R. MacDonald
Assistant Examiner—Patrick N. Edouard
Attorney, Agent, or Firm—Harness, Dickey & Pierce, P.L.C.

[57] ABSTRACT

The word hypothesizer reduces the search space for more computationally expensive word recognizers. Each periodic interval of input speech is represented as a vector of phoneme similarity values from which the high similarity regions are selected and parameterized. The hypothesizer computes alignment parameters for each of a plurality of previously stored word prototypes, vis-a-vis the high similarity regions of the input speech utterance. Those word prototypes having the highest recognition scores are selected as word candidates for the fine match recognizer.

23 Claims, 15 Drawing Sheets

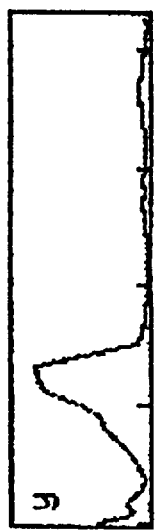
FIG. 1.

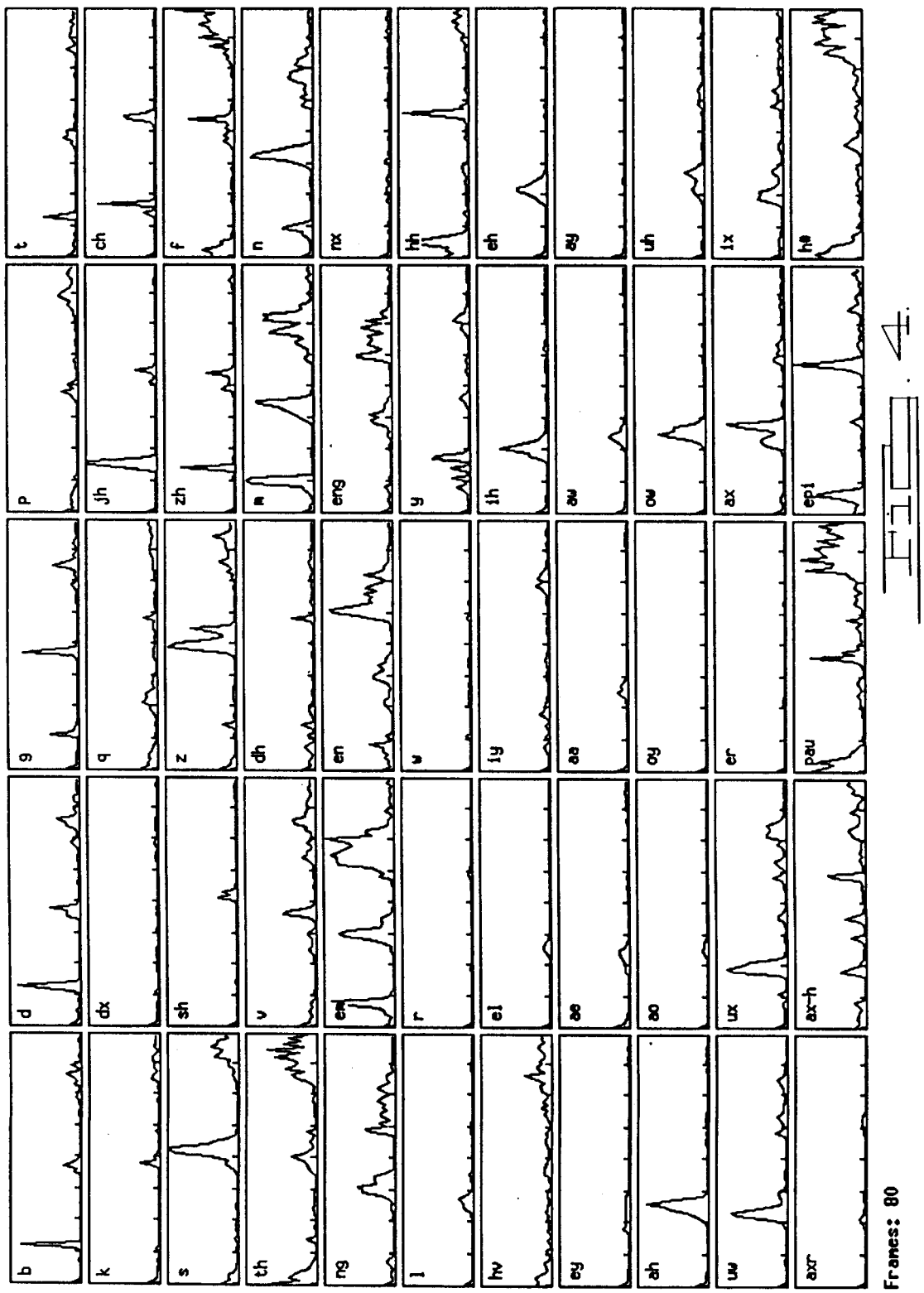

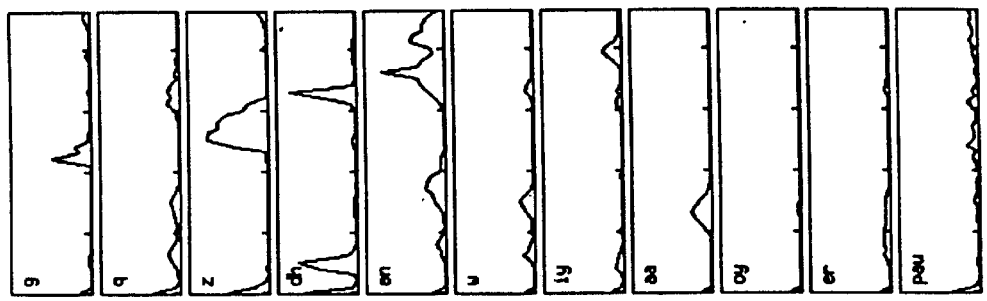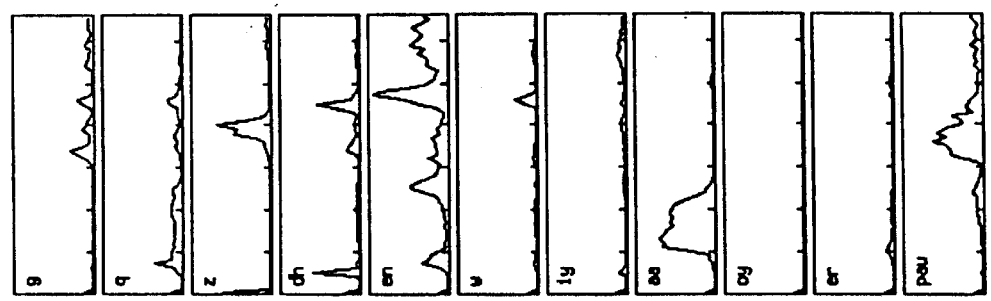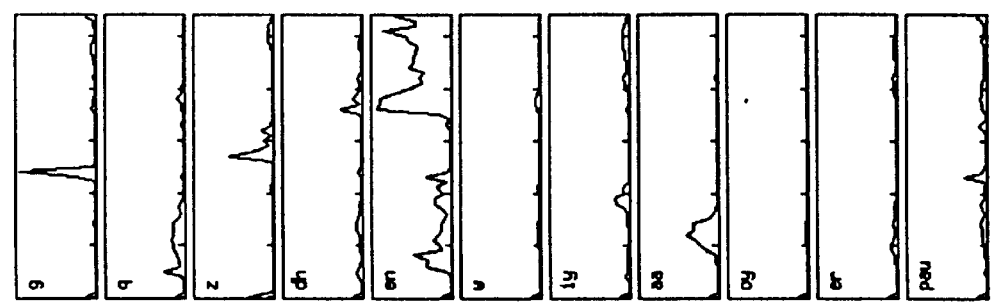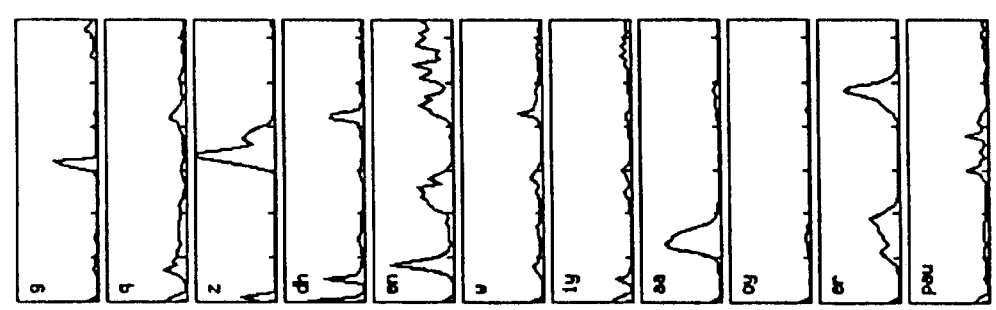

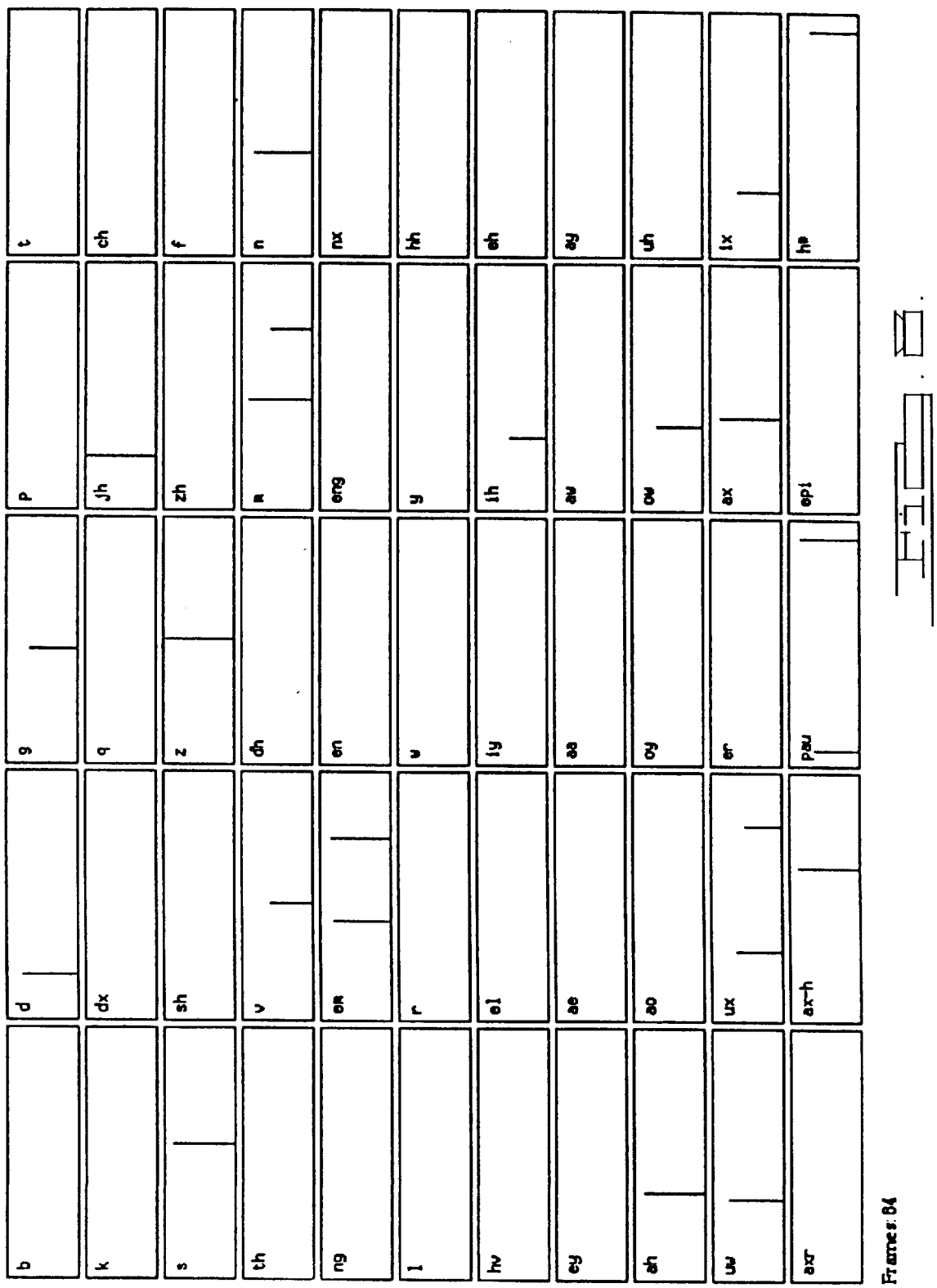

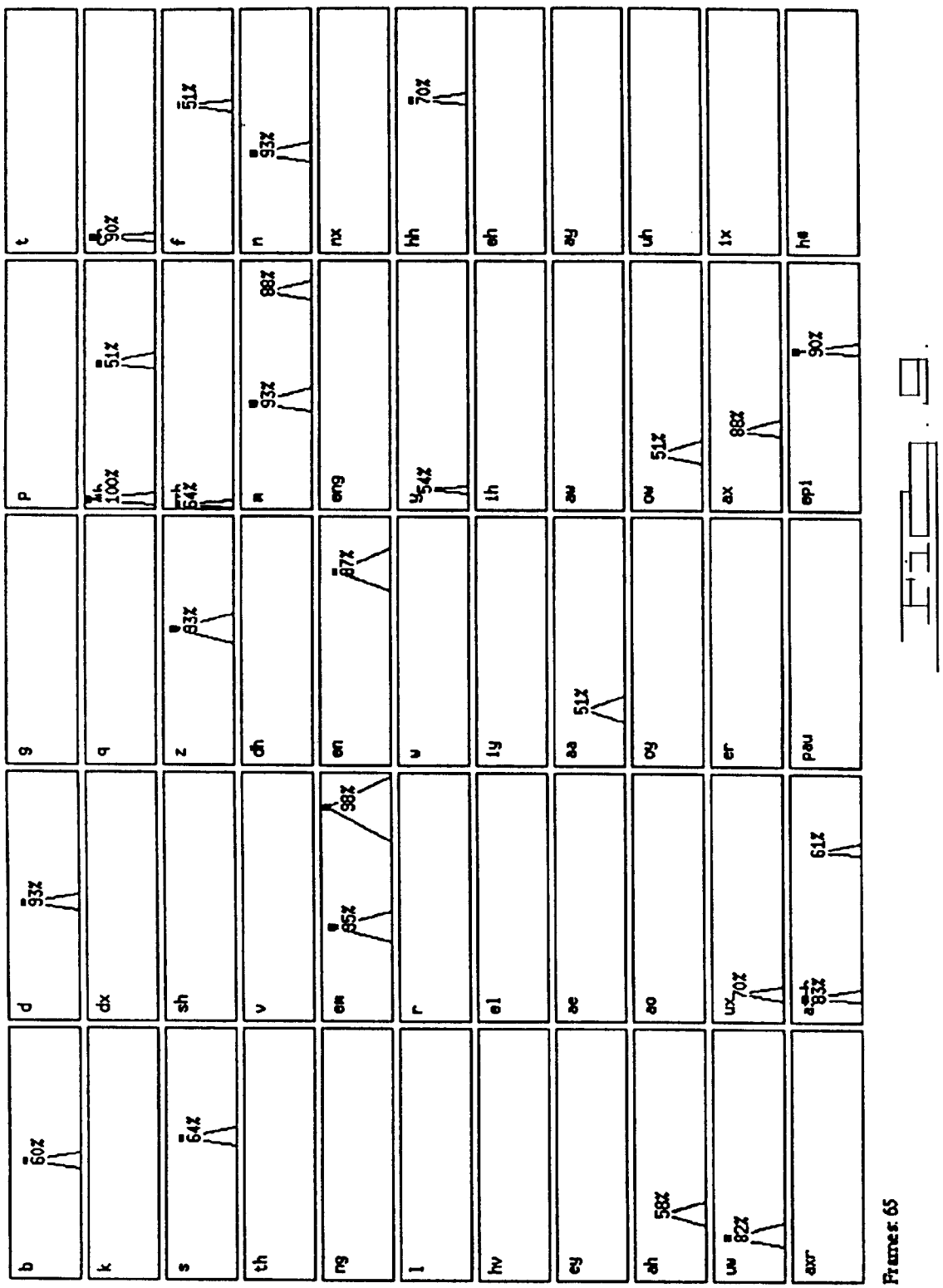

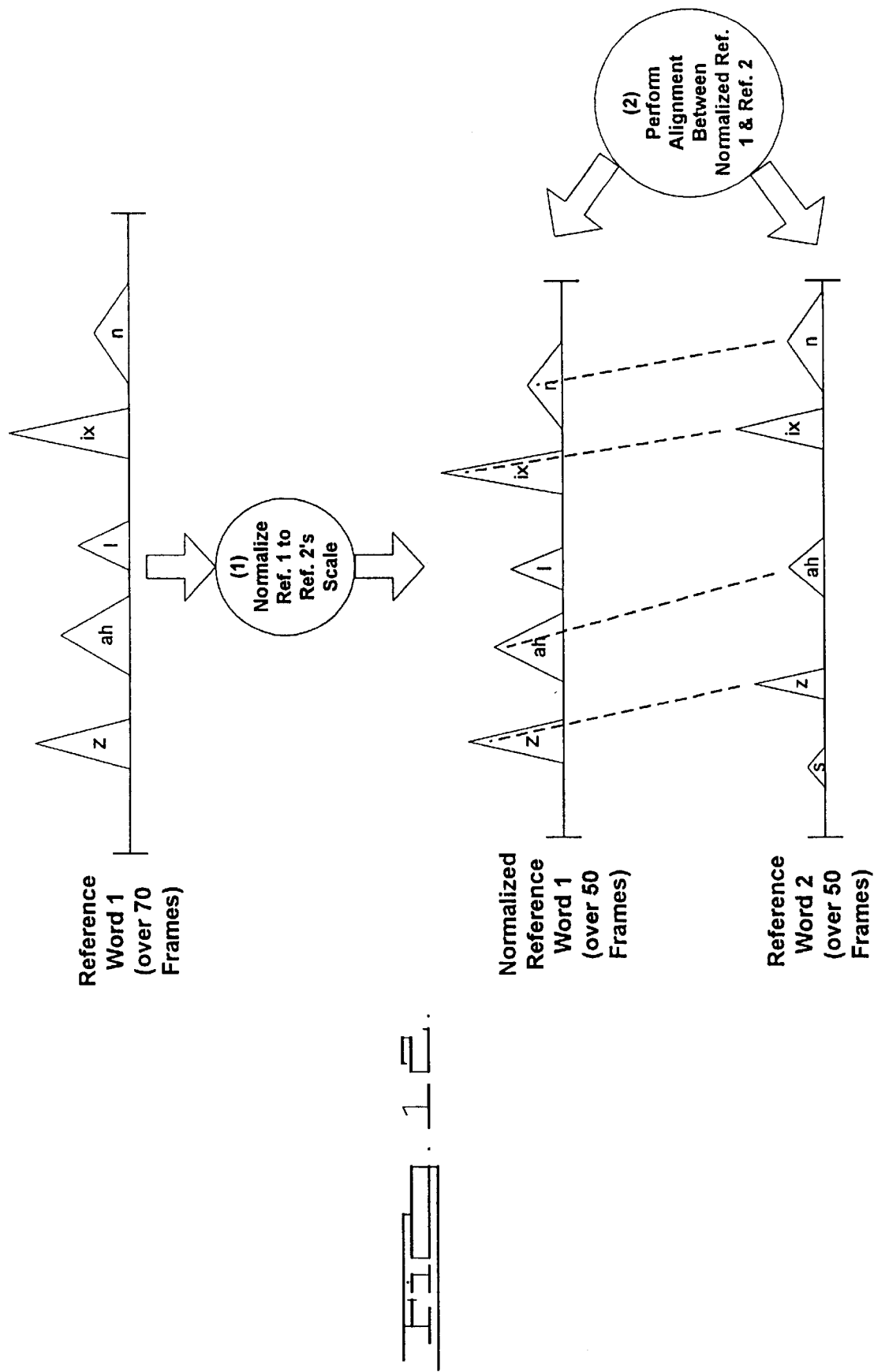

WORD HYPOTHESIZER BASED ON RELIABLY DETECTED PHONEME SIMILARITY REGIONS

BACKGROUND AND SUMMARY OF THE INVENTION

The present invention relates generally to speech recognition systems. More particularly, the invention relates to a word hypothesizer for processing an input speech utterance to yield one or more word hypotheses that correspond to the input speech utterance. The word hypothesizer is useful, for example, in selecting word candidates from a word dictionary so that a more computationally expensive template-based word recognizer may find the closest match more quickly, by reducing the size of the dictionary to be searched.

The invention uses phoneme similarity time series as initial speech representation. Unlike conventional frame-by-frame dynamic programming approaches using a phoneme similarity front end (e.g. model speech method), the word hypothesizer converts phoneme similarities to a sequence of high phoneme similarity regions. This conversion has the effect of reducing the complexity of the speech representation. Each word of the lexicon is then coded as a list of reliable phoneme similarity regions called phoneme targets which provides a compact robust word representation. Differing from the frame-by-frame approach, this novel approach requires less memory to store words models and results in significantly faster recognition times since the search space is greatly reduced.

Conventional phoneme similarity-based speech recognition systems match each input speech utterance to a reference template comprised of phoneme similarity vectors. These systems use word recognizers that work on a frame-by-frame basis, in which every 10 or 20 milliseconds of input speech is represented as a vector of phoneme similarity values for a given set of phoneme labels (e.g. labels from the TIMIT database). The word recognizer uses this data in a frame-by-frame dynamic programming match to a word template.

The above technique works well for small vocabularies. However, for larger vocabularies, the conventional technique becomes computationally costly. As the vocabulary size is increased, the computation time needed to search the entire vocabulary space increases geometrically. This necessitates faster, more expensive processors. As a result, it is not economically feasible to implement speech recognition systems in low cost consumer products.

The present invention departs from the high data rate frame-by-frame model found in conventional designs. In place of the frame-based word template, the present invention constructs novel target-based word prototypes that are capable of modeling words with significantly fewer parameters. By comparison, where a frame-based template might require 1200 parameters per second, the target-based prototype requires typically fewer than 250 parameters per second. Given the fact that the alignment complexity (for aligning a reference with a test word) is proportional to the square of the number of parameters used to represent the word, the novel representation enables faster decoding and is applicable to larger vocabularies. The present invention also features a fast alignment procedure which contrasts to the costly dynamic time warping alignment procedures used in conventional recognizers.

Typically the word hypothesizer can be used in two ways. It can be used as a recognizer or it can be used as a fast-match procedure to a more computationally costly recognizer performing fine match recognition. In the latter case, the fine match recognizer will only consider the word candidates output by the word hypothesizer. The conventional word recognizer thus operates more quickly because it does not have to search the entire vocabulary or dictionary. As a consequence the entire system (i.e. fast match and fine match) can perform in real time for medium size vocabularies (i.e. 100 to 1000 words).

The word hypothesizer of the invention includes a phoneme model database for storing phoneme model speech data that corresponds to a plurality of phonemes. A phoneme similarity module compares the input speech utterance with the phoneme model database to produce phoneme similarity data that are indicative of the correlation between the input speech utterance and the phoneme model speech data with respect to time. The word hypothesizer also includes a word prototype database for storing word prototype data that correspond to a plurality of predetermined words. The word prototype data are target-based data that represent the predetermined words as a plurality of targets. Each target represents a typical occurrence of a high phoneme similarity region at a specific time location. High similarity regions are automatically extracted from the phoneme similarity time series by a region picking procedure. A prototype comparator is coupled to the word prototype database and also to the phoneme similarity module. The prototype comparator correlates the phoneme similarity data and the word prototype data to select at least one of the predetermined words as a word hypothesis or word candidate for the input speech utterance To each word candidate is attached a recognition score.

In effect, the input speech utterance is converted into a region-based representation and that region-based representation is compared with the word prototypes to ascertain possible word candidates or word hypotheses. The best hypothesis is then selected as the recognized word corresponding to the input speech.

For a more complete understanding of the invention, its objects and advantages, refer to the following specification and to the accompanying drawings.

BRIEF DESCRIPTION OF THE DRAWINGS

FIG. 1 is a phoneme similarity time series for the word "hill" spoken by two speakers;

FIG. 3 is a block diagram of the word hypothesizer;

FIG. 4 is a set of graphs showing exemplary phoneme similarity data for the word "Johnson";

FIG. 6a is a graph illustrating various features of a phoneme similarity curve;

FIG. 6b is a graph illustrating a phoneme similarity unimodal representation along with its target features;

FIG. 7 compares the unimodal representation and an alternative bimodal representation;

FIG. 12 is a graph illustrating the alignment procedure; and

DETAILED DESCRIPTION OF THE PREFERRED EMBODIMENT

The Word Prototype

Figure 2A:
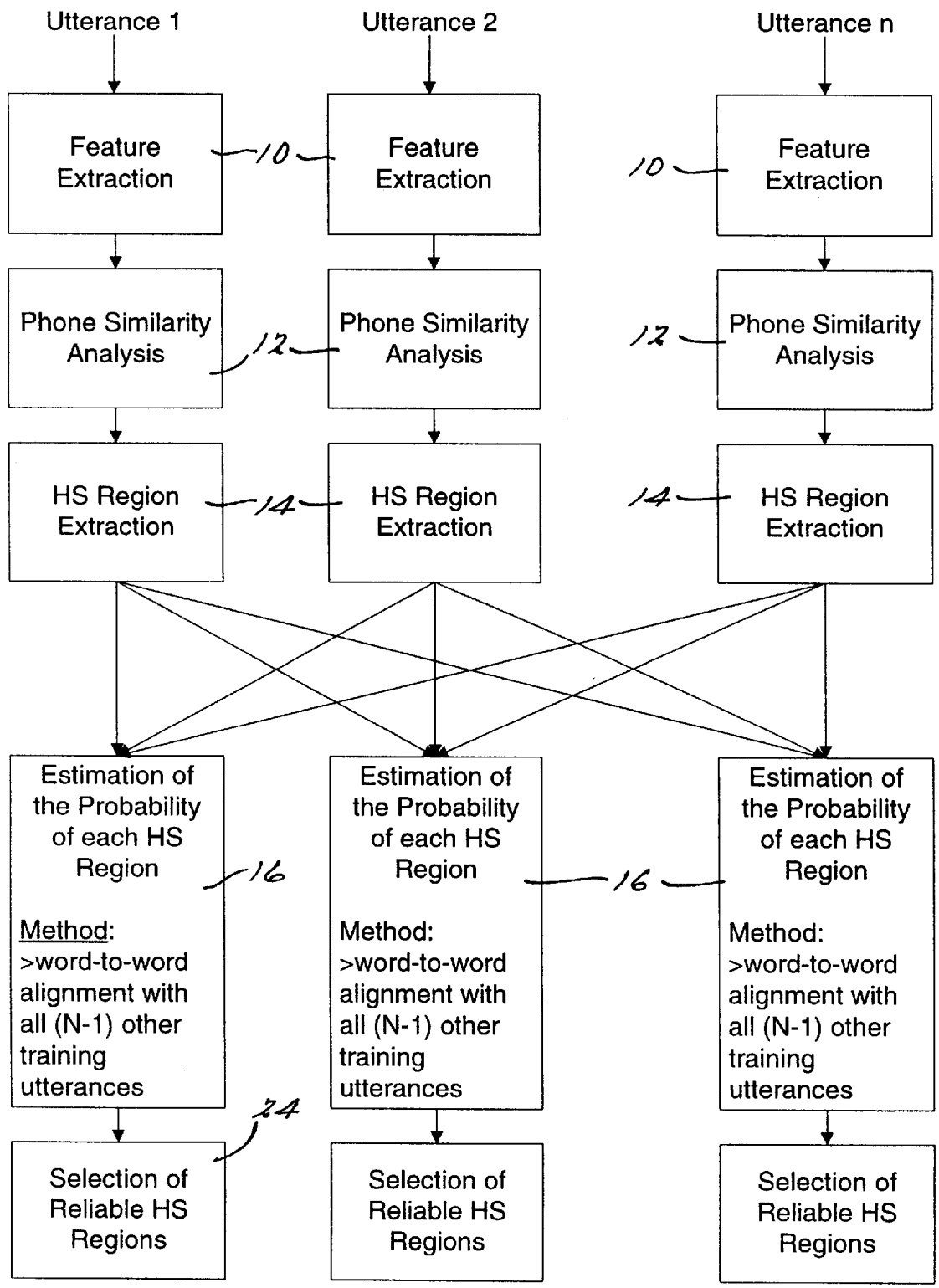
FIGS. 2a, 2b and 2c (referred to collectively as FIG. 2) is a flowchart illustrating the word prototype training procedure.

The present invention uses a unique word prototype that is based on reliably detected phoneme similarity regions. Before discussing the presently preferred embodiment of the word hypothesizer, a description of the word prototype will be presented.

The present invention employs a unique compact speech representation based on regions of high phoneme similarity values. As shown in FIG. 1, there is an overall consistency in the shape of the phoneme similarity time series for a given word. In FIG. 1 phoneme similarity time series for the word "hill" spoken by two speakers are compared. Although the precise wave shapes differ between the two speakers, the phoneme similarity data nevertheless exhibit regions of similarity between the speakers. Similar behavior is observed in the phoneme plausibility time series that has been described by Gong and Haton in "Plausibility Functions in Continuous Speech Recognition: The VINICS System," *Speech Communication*, Vol. 13, Oct. 1993, pp. 187–196.

Conventional speech recognition systems match each input utterance to reference templates, such as templates composed on phoneme similarity vectors, as in the model speech method (MSM) of Hoshimi et al. In these conventional systems the reference speech representation is frame-based and requires a high data rate, typically 8 to 12 parameters every 10 to 20 milliseconds. The frame-by-frame alignment that is required with these conventional systems is computationally costly and makes this approach unsuitable for larger vocabularies, especially when using small hardware.

The present invention electronically represents a given speech utterance signal as a digital prototype according to the following method. The prototype model is built by providing at least two utterances of training speech in order to measure the reliability with which particular regions of high phoneme similarity are found in the training data for a particular word. This ensures that only targets corresponding to reliably found regions of phoneme similarity are preserved in the word prototype.

Training utterances may be obtained from a given single speaker ("Speaker-Dependent" training), a large number of highly diverse representative speakers ("Speaker-Independent" training) or some other distribution of speakers (e.g. "Cross-Speaker" training).

For each given training utterance, the speech data is processed to obtain phoneme similarity values for each phoneme symbol in each time frame (e.g. as is done by Hoshimi et al.). Then the "raw" regions of high phoneme similarity (HS regions) are found by a region picking procedure. The output of this procedure represents HS regions that have not yet been screened for high reliability.

Having extracted raw HS regions for all training utterances, the reliably found HS regions are determined by aligning all pairs of training utterances. Note that, as the utterances are represented as a series of HS regions (rather than a series of frames) aligning a pair of utterances requires finding pairs of regions, one in each utterance, which may be matched. HS regions may only be matched if they are in different utterances, have identical phoneme symbols and their time locations may be made to closely agree by a suitable shifting and stretching of the time scale. In this regard, a region in utterance "A" may match at most one other region in utterance "B."

The reliable HS regions are then merged through an iterative merging operation that consolidates the data from a plurality of speakers into a single word prototype. The word prototype may contain a plurality of targets corresponding to the HS regions. These targets are represented by the following parameters: center height, center frame location, and left and right frame locations.

The number of targets in the word prototype may be reduced to conform to a predetermined Target_Rate (i.e. desired number of targets per second as measured in the training data), by eliminating those initial targets with lowest probability ("Target Weight").

The word prototype consists of the surviving targets plus the average word duration and average match rate (i.e. average region-to-target alignment score on the training data).

Figure 2B:
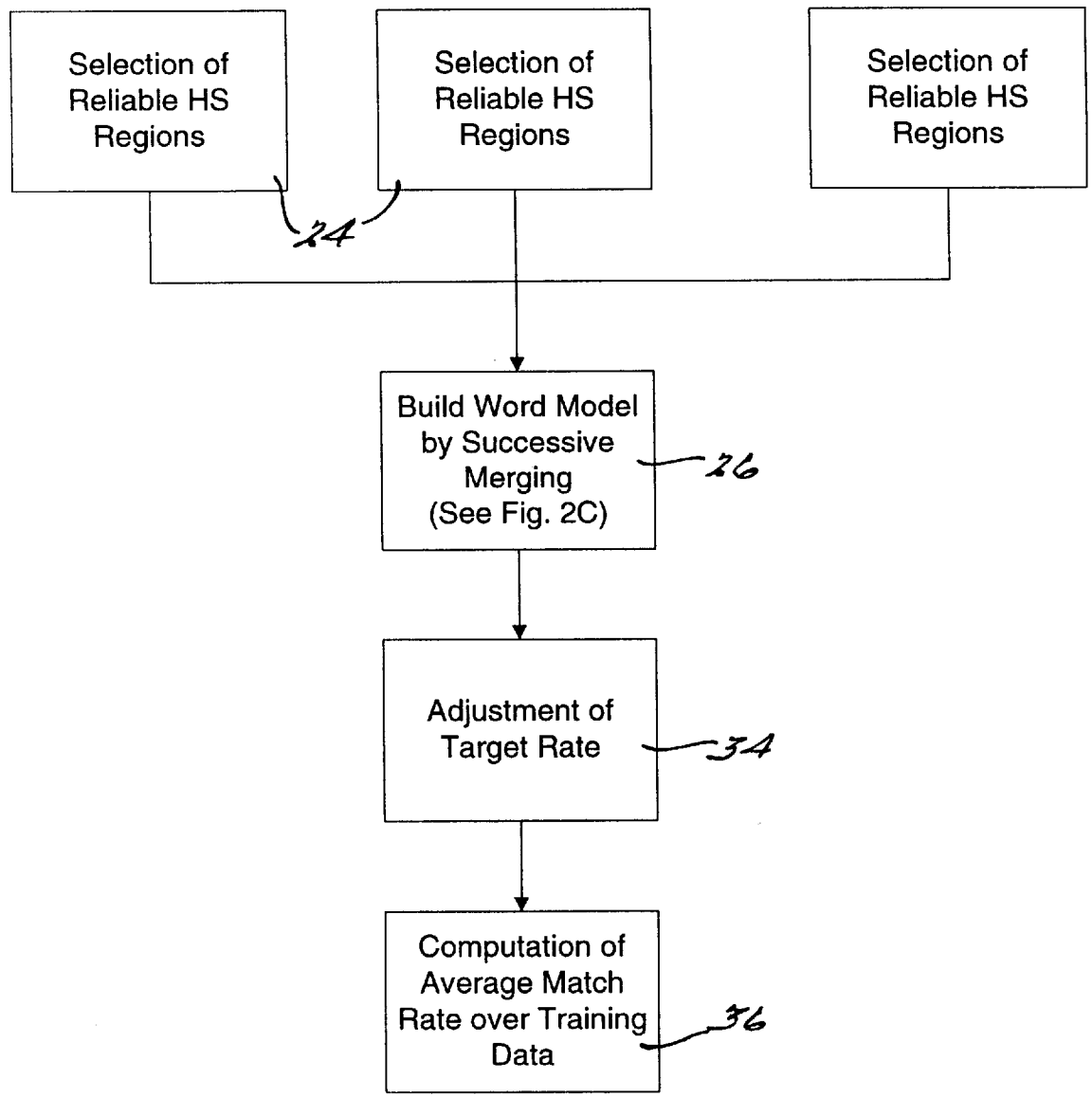
Figure 2C:
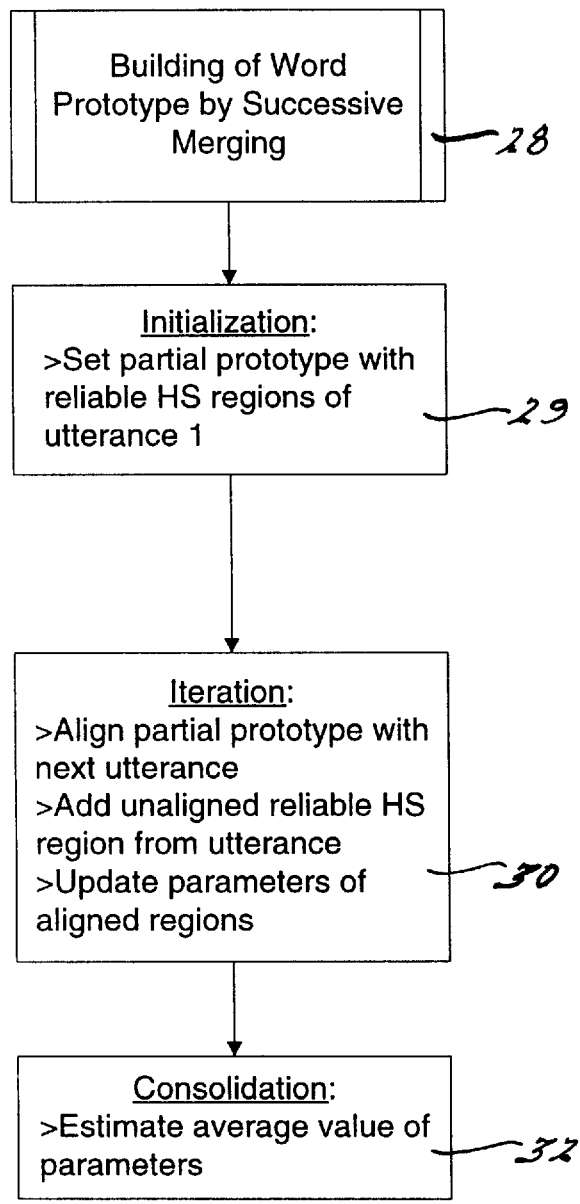

FIGS. 2a, 2b and 2c (collectively FIG. 2) more fully illustrate how the word prototype is constructed. FIG. 2 depicts the presently preferred word training procedure. A plurality of utterances of a given word are used to construct the word prototype. These utterances may be by the same speaker or by different speakers. In FIG. 2a n utterances are illustrated. Each utterance is processed separately up to a certain point, as illustrated in FIGS. 2a and 2b. Ultimately, the results of the individually processed utterances are combined to produce the word prototype for the given word.

Each utterance is first subjected to feature extraction signal processing as depicted at step 10. This involves digitizing the speech such as at 8 kilohertz and then using an end point detection procedure to automatically detect the beginning and ending of the speech. An 8th order linear predictive coding (LPC) analysis or other suitable coding analysis is made on the detected speech.

Next, a phoneme similarity analysis is performed on the data as at step 12. Phoneme similarities are computed for each phoneme of a phoneme database. The presently preferred embodiment breaks down speech into 55 phonemes corresponding to the different sounds that make up speech. See FIG. 4 which illustrates exemplary data in a 5×11 grid corresponding to the 55 phonemes. The phoneme similarity analysis is preferably performed periodically so that every 10 milliseconds of speech is represented by a vector of 55 components representing phoneme similarity data.

Next, the high similarity (HS) region picking procedure (step 14) detects for each phoneme those regions that include at least one peak of phoneme similarity value that exceed a predefined threshold. Referring again to FIG. 4, it is seen that certain phonemes contain phoneme similarity peaks. The data illustrated in FIG. 4 are for the spoken word "Johnson." By way of illustration, the phoneme "em" contains several phoneme similarity peaks in this particular utterance; the phoneme "r" contains no peaks in this particular utterance. The presently preferred embodiment uses 5 parameters to represent an HS region. These parameters are the phoneme label, namely the identifier corresponding to the given phoneme ("em" and "r," for example); the peak center height, the peak center frame location, the left frame location and the right frame location. These parameters are illustrated in FIG. 6a and described more fully below.

As illustrated at step 16, the procedure builds a training set for a given word comprising a list of utterances of the word. This training set can be from different speakers (to build a speaker-independent word model) or from one single speaker (to build a speaker-dependent word model). As illustrated, the data are prepared for training by computing the HS regions for all training utterances.

The objective of the word prototype is to build a compact word model based on the HS regions. The representation is defined by:

(a) average word duration expressed in number of 10 millisecond frames;

(b) list of targets (a target represents a typical production of an HS region for a phoneme. It is obtained during a word training procedure by averaging two or more examples of the same HS region. In the process one parameter, which is the probability of observing the HS region is added. There are therefore 6 parameters for modeling a target.)

(c) average recognition score over the training data.

A word-to-word alignment is performed to find the region-to-region relation between two utterances of the same word. The alignment process uses a search procedure that assumes a linear relation (y=ax+b) between the two utterances. The alignment is designed to obtain an alignment time much smaller than a conventional dynamic time warping (DTW) alignment. This same alignment procedure is also used during the recognition process in order to avoid introducing any bias.

The search procedure used in step 16 is iterative (successive refinement of the "a" "b" parameters) to allow for time distortion between the test word and the word prototype. Three iterations are performed in the presently preferred embodiment. In this successive refinement parameter "a" represents the time dilation and parameter "b" represents an offset in the test word. An estimation of the "a" and "b" parameters allows adjustment to compensate for variation in word duration and to compensate for possible errors in the endpoint detection procedure used in step 10.

The alignment procedure results in a list of region-region pairs. In practice, all regions of a first utterance may not be aligned with regions of a second utterance, because of the inherent variability in the pronunciation across speakers or within a same speaker.

Whereas step 14 results in a selection of HS regions that exceed a predefined threshold, merely exceeding this threshold does not mean that a given HS region from a given utterance is necessarily reliable. Thus in step 24 the reliable HS regions are detected within a word utterance, to identify the HS regions present in a word utterance that are stable across multiple repetitions of the same word. The technique used is to compute the word-to-word alignment between a given word utterance and all remaining utterances of the word in the training set. By doing so, the probability of observing the region is obtained. The probability is defined as the number of times the region could be aligned in all remaining utterances divided by the number of those utterances. The procedure discards the HS regions in the word utterance whose probability is below a predetermined target probability threshold. This threshold, like the region picking threshold used in step 14 can be determined empirically to achieve the desired target rate.

Continuing with the word training procedure, refer to FIG. 2b. In FIG. 2b step 24 has been repeated to show continuity with FIG. 2a. In step 26 a word model is now constructed by a successive merging of the data from each of the n utterances. Step 26 is shown in detail in FIG. 2c. Referring to FIG. 2c, the word model is built by merging together all the training utterances each described as a list of HS regions and their duration. At each step in the iteration, a partial word model is built. When the last utterance is merged, the partial word prototype is consolidated and the word prototype is thereby obtained. This iterative merging procedure is performed by selecting the word utterance whose duration is closer to the average word duration over the training set and setting this word utterance to be the initial partial word prototype. Step 29. Then, each remaining utterance is merged to build a new partial prototype incrementally. Step 30. The merging uses a word-to-partial utterance alignment procedure. After the merging is complete a target rate constraint is applied by adjusting the number of targets to be kept. In this way a more compact word model is obtained.

The word-to-partial utterance alignment essentially finds the region-to-partial target relation between the word utterance and the partial prototype. A search procedure is performed that assumes a linear relation (y=ax+b) between the word utterance and the partial prototype. The objective is to obtain an alignment time that is much smaller than a conventional DTW alignment. This same alignment procedure is used in the recognition process in order to avoid introducing any bias. The search procedure is iterative (successive refinement of the "a" and "b" parameters) to allow for time distortion between the test word and the word prototype. Three iterations are performed in the presently preferred embodiment. The "a" parameter represents the time dilation and the "b" parameter represents an offset in the test word. Estimation of the "a" and "b" parameters allows for adjustment to compensate for variation in word duration and to compensate for possible errors in the endpoint detection. This procedure 28 produces a list of region-partial target pairs. In practice, all partial targets may not be aligned with regions of the word utterance, because of the inherent variability in the pronunciation across speakers or within the same speaker.

The word utterance is merged with its partial prototype. Initially, word-to-partial utterance alignment is performed. Next, for each of the aligned partial targets the center height, center frame and left and right frame location statistics are updated. Finally, all unaligned regions of the word utterance are inserted in the partial prototype with their statistics set to an initial value corresponding to the inserted HS region's parameters.

Finally, the final partial prototype is consolidated at step 32. The consolidation procedure is used to finalize the word prototype. The procedure involves computing the average values for the center height, center frame and left and right frame locations for each partial target. The computed values become the parameters of the target. In addition, the procedure computes an estimate of the probability of each newly built target by aligning the word prototype with all of the utterances of the training set. The average recognition rate is also computed by executing a single word comparison procedure for each utterance of the word in the training set.

In some applications it may be desirable to adjust the target rate, to achieve a given level of compactness in the modeling of words. Referring to FIG. 2b, this step may be performed at 34. Given a target rate value and the average duration of a word, the desired number n of targets for that word is given by the target rate multiplied by the average duration. Only the top n targets having the highest probability are kept. Finally, in step 36, the average match rate is computed over the training data to be used as part of the global statistics for subsequent word hypothesizer and recognizer operations.

The Word Hypothesizer

Referring now to FIG. 3 a description of a first embodiment of the word hypothesizer will now be presented. In FIG. 3, the word hypothesizer is depicted generally at 200. The word hypothesizer is used to reduce the search space for a more computationally expensive, template-based word recognizer. The word hypothesizer converts the input speech signal into a phoneme similarity time series. This is done by digitizing the input speech signal at 8 kHz and processing it by 8th order linear predictive coding (LPC)analysis to produce 8 Cepstral coefficients for every 100th of a second. Each block of ten successive frames of Cepstral coefficients is compared to 55 phoneme reference templates (a subset of the TIMIT phoneme units) to compute a vector of multiple phoneme similarity values. The block of analysis frames is then shifted by one frame at a time to produce a vector of phoneme similarity values each centisecond (each 100th of a second). To do so, the input speech signal is fed to a phoneme similarity calculation module 202 that uses the phoneme template 203 to produce the phoneme similarity values.

These phoneme similarity values are then fed to module 204 which selects those high similarity (HS) regions that are above a predetermined high similarity threshold. The peak driven procedure performed by module 204 extracts high similarity regions, discarding low peaks and local peaks of phoneme similarity values in the process. These high similarity regions are modeled in the preferred embodiment by five parameters, namely phoneme symbol, center location of peak, height at peak location and time locations of the left and right frames. Over our data corpus, an average of 60 regions per second of speech is observed.

Figure 13A:
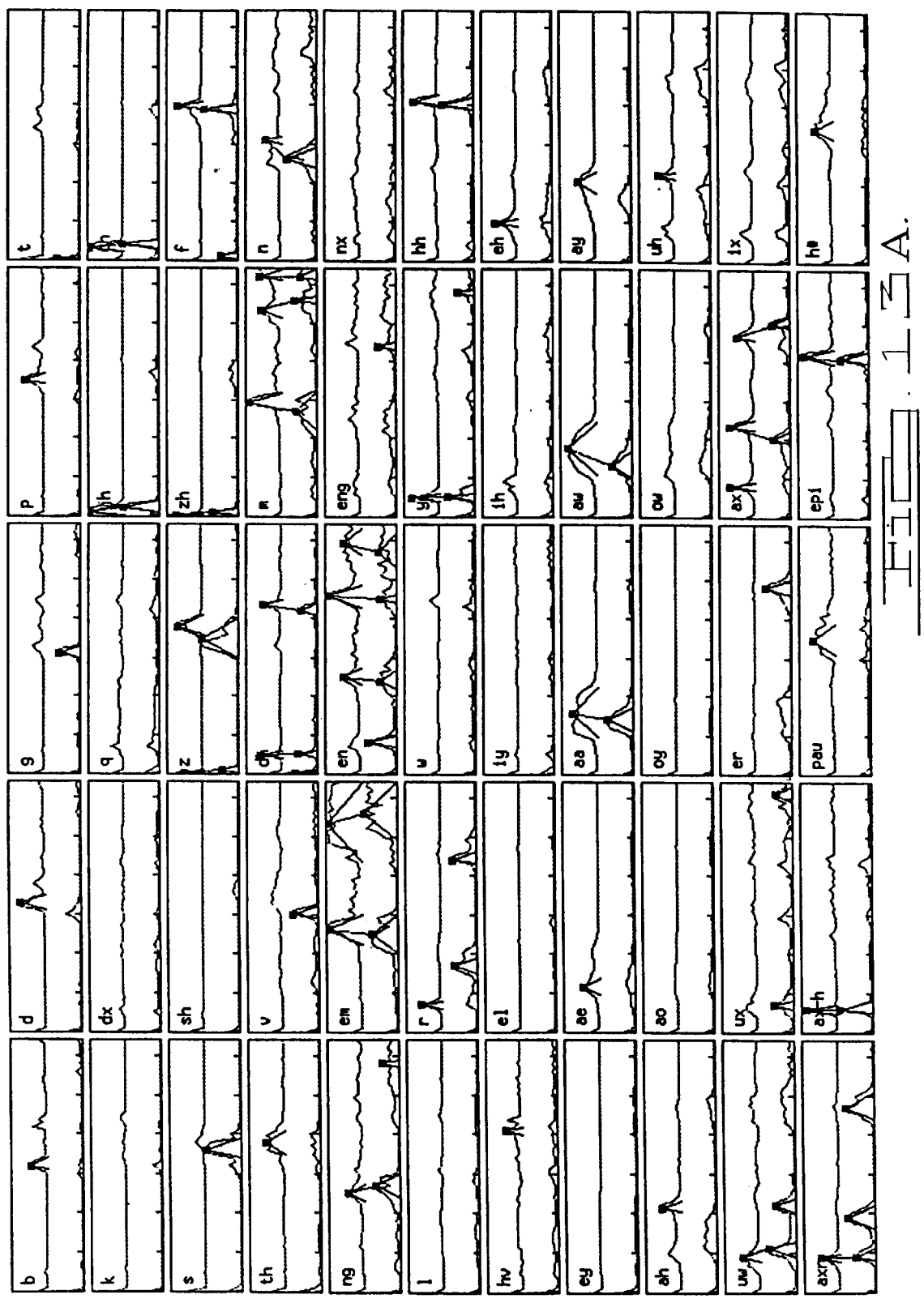
FIGS. 13a and 13b (collectively FIG. 13) are a set of graphs illustrating the word-to-word alignment that is used in selecting the reliable HS regions.
Figure 13B:
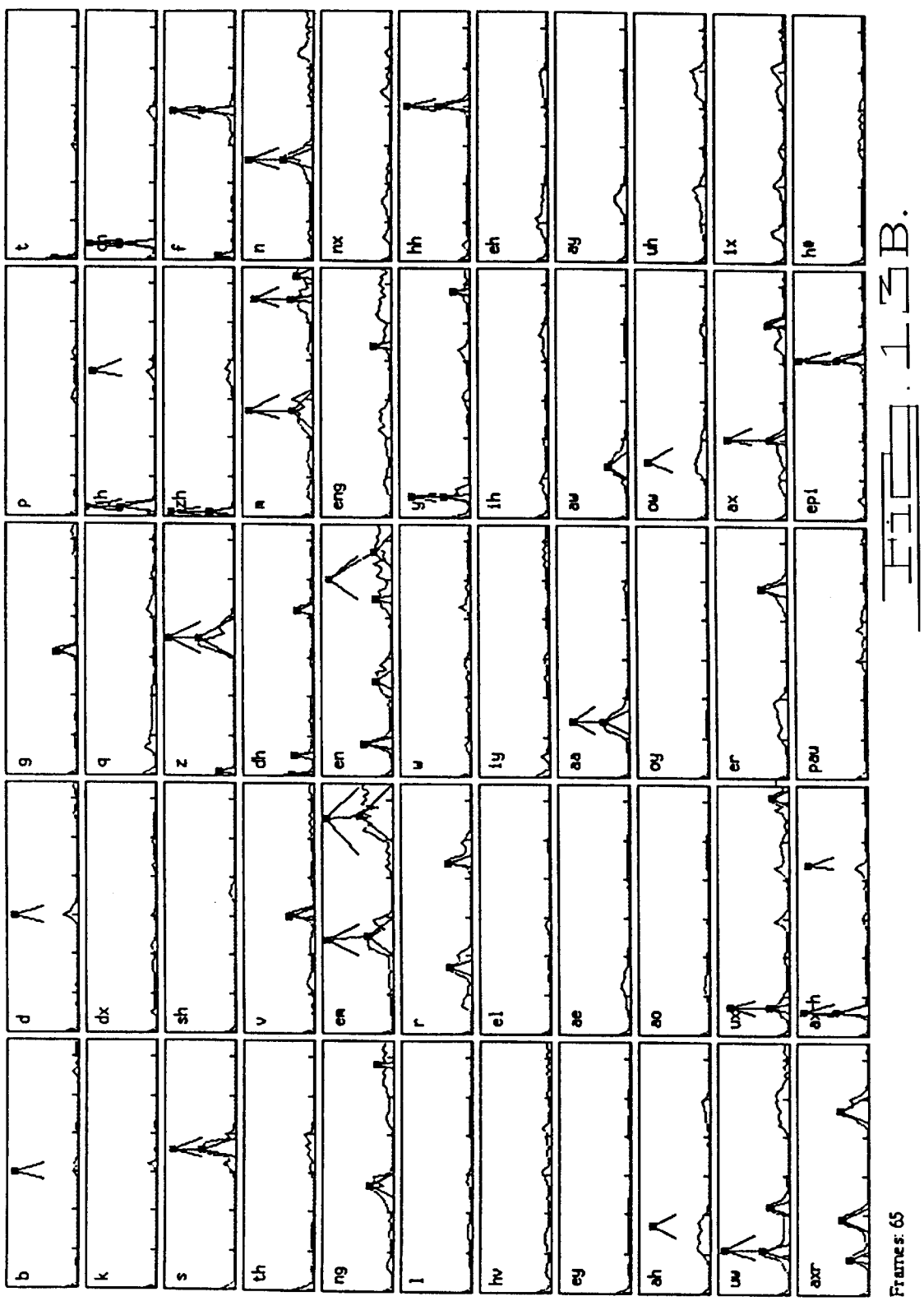

The raw HS regions are then fed to the alignment module 206. The alignment procedure uses the word prototype database 208 that was developed during the word prototype training session, described previously. Module 206 performs an alignment process illustrated diagrammatically in FIG. 12. Also see FIGS. 13a and 13b. These figures show how the alignment procedure is performed on exemplary data.

The region-to-target alignment allows the parameterized input speech to be compared with the word prototypes in database 208. The word prototype consists of a series of phoneme targets and associated global statistics, namely the average word duration and the average "match rate" that represents the degree of fit of the word prototype to its training data. As previously described, the word prototype is made up of targets that are generalized HS regions described by the five parameters: phoneme symbol, target weight, average peak height, average left frame location and average right frame location. The input speech data, having been similarly parameterized by the preceding modules, is compared with the word prototype data to compute recognition scores for each word in the lexicon. Module 210 selects the N best candidates based on the recognition scores for each word in the word prototype database or lexicon. The process then may iteratively loop back through module 206 for a plurality of iterations, optionally altering the degree of detail. To alter the degree of detail the two parameter representation of FIG. 8 may be first used, followed by the five parameter representation of FIG. 9 on the successive iteration.

Modules 206 and 210 select the word candidates using a region-to-target alignment procedure to produce a congruence score between the input speech word and the given reference word of the word prototype database. The congruence score of a matched target $CG_{match}$, that is, the alignment found between target t of the prototype and region r of the test word, is defined as $$CG_{match}(t,r) = \min(A_t/A_r, A_r/A_t)$$

where $A_t$ and $A_r$ respectively represent the target's area and the aligned region's area in the time similarity plane.

The congruence score of an unmatched target $CG_{unmatch}$ is computed in the same way, using an estimate for the area $A_r$ of the missing HS region. The estimated area $A_r$ is computed as the area under the similarity curve for the target's phoneme label, between the projected locations of the target's left and right frames.

The word congruence score is computed as the weighted sum of congruence scores for all the targets, divided by the sum of their weights. In this embodiment the five words having the highest combined scores are selected as word candidates for the final stage fine match process.

Further Description of System Operation

FIG. 4 provides an example of the output from the phoneme similarity calculation function 202. Specifically, FIG. 4 shows exemplary phoneme similarity data for the word "Johnson" as uttered by a speaker. The ordinate axis for each of these curves represents the phoneme similarity value. The abscissa axis represents time which is broken up into 80 time frames. The letter or letters in the upper left-hand corner of each graph denote the particular phoneme being analyzed for the degree in which that particular phoneme was found in the word "Johnson" and at which time frames. FIG. 4 is arranged as an 11×5 matrix (55 curves) corresponding to the 55 phonemes used in the preferred implementation.

Figure 5:
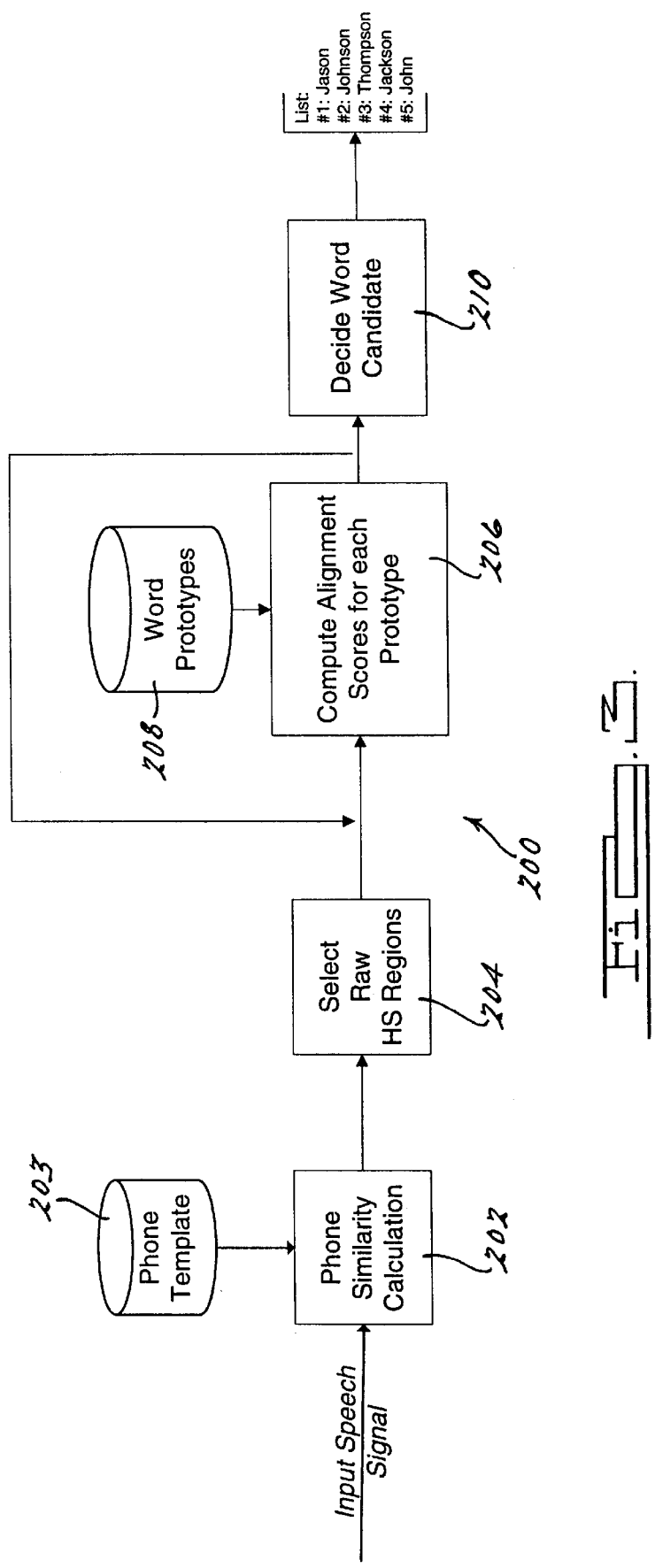
FIG. 5 is a set of graphs depicting a comparison of a subset of the phoneme similarity data for the word "Johnson" as spoken by four different speakers.

FIG. 5 compares a subset of 11 phoneme similarity curves for the same word "Johnson," but as spoken by four different speakers (aja, chr, jts and zas). This figure highlights the problem to which this present invention is directed—namely, recognizing words with enough detail to overcome the differences in speaking patterns by different speakers, while at the same time using as little data as needed for performing speech recognition calculations efficiently and quickly.

As discussed above, the present invention uses a novel word representation that provides enough detail to efficiently and quickly analyze speakers' utterances. FIG. 6a is a magnification of a portion of the phoneme similarity data, showing the high similarity (HS) regions upon which the word representation is based. Specifically, the representation is based on identifying "interesting regions" or peaks of phoneme similarity values. The high similarity (HS) region is extracted by a region picking procedure that extracts or locates peaks that exceed a predetermined threshold 300. As illustrated in FIG. 6a, the data may contain one or more maxima of phoneme similarity regions. Depending on the degree of detail used in the representation of a phoneme target, one or more features are extracted. The region picking procedure is peak-driven. And so any time interval containing a peak whose similiarity value is greater than a threshold, a region is associated. The minimal information is the HS region center frame location. Other features can be computed to better define the phoneme information in the speech utterance.

In general, each HS regions defines a global region 304 that determines the global region height 306 (in units of phoneme similarity). Other features of a section include the left boundary frame 308, the center frame 310 and the right boundary frame 312 (both in units of time). In the preferred embodiment, high similarity regions are typically represented by a triangular shape 314.

FIG. 6b shows the preferred triangular-shaped phoneme similarity model for an utterance containing the phoneme "s." In the preferred embodiment, the input speech utterance is represented by at least the phoneme symbol "s" and the center frame 330. For greater resolution in representing an input speech utterance, the following other features are used: the left boundary frame 332, the right boundary frame 334 and the center height 336.

Figure 8A:
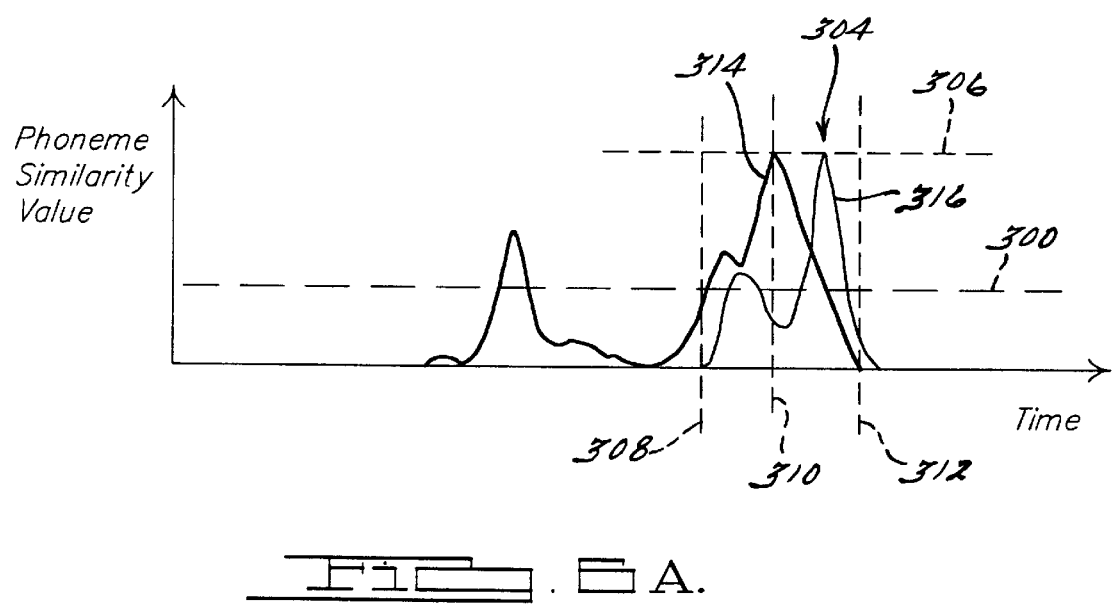
FIG. 8 is a set of graphs using only two target features (center height and center location) to represent a word prototype.
Figure 8B:
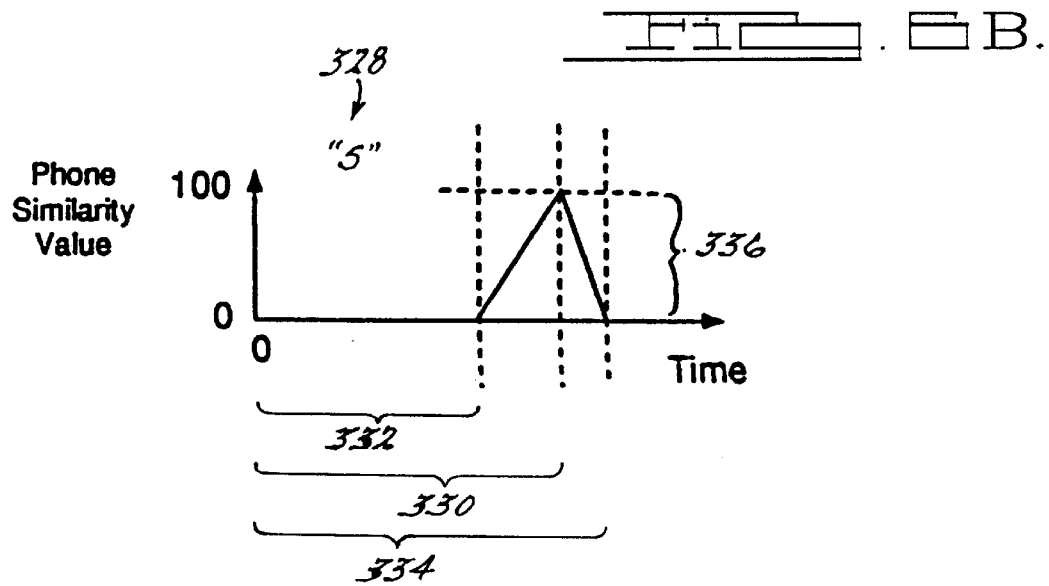
Figure 9:
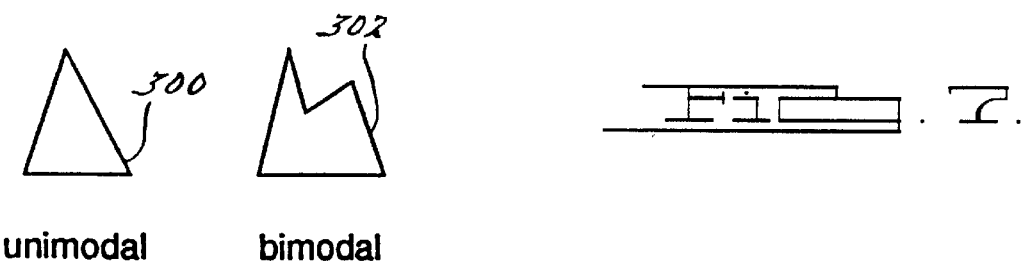
FIG. 9 is a set of graphs using five target features to represent an utterance.

FIG. 8 is an example of using the two minimal representative features (i.e., center height and center frame) in analyzing a particular input speech utterance. The similarity threshold value was set to 50. FIG. 9 is an example of depicting an input speech utterance by a greater number of features. The features here are: (1) center frame, (2) left boundary frame, (3) right boundary frame, (4) center height. The similarity threshold value which is also referred to as "section picking threshold" was set to 40. The region picking threshold can be adjusted in order to pick more or fewer regions. The typical range for the threshold is 30% to 80%.

Word Hypothesizer Results

Figure 10:
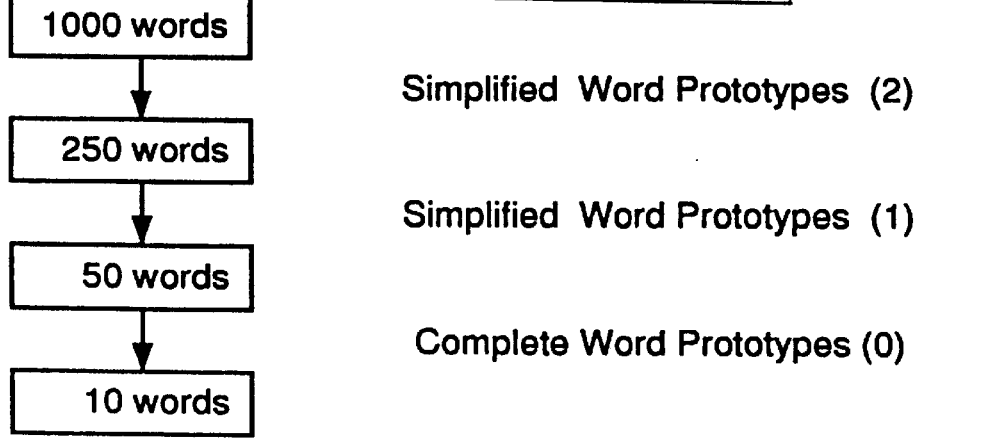
FIG. 10 is a block diagram illustrating the decreasing number of word candidates for each iteration of the word hypothesis procedure after each stage.

FIG. 10 depicts exemplary results of successive iterations of the word hypothesizer. The first iteration produced a number of word candidates equal to 1000. The next iteration with a greater amount of detail to represent the input speech utterance yielded 250 word candidates. The third iteration yielded 50 word candidates. The last iteration yielded 10 word candidates which for this example provided to be an acceptable number of word candidates. The adjustable degree of detail and the multiple word representations as applied in the iterative approach of the invention reduces the overall amount of computation by using a low data rate with few features as applied to a large number of word candidates, and then using the highest data rate with all features as applied to a small number of word candidates.

Figure 11:
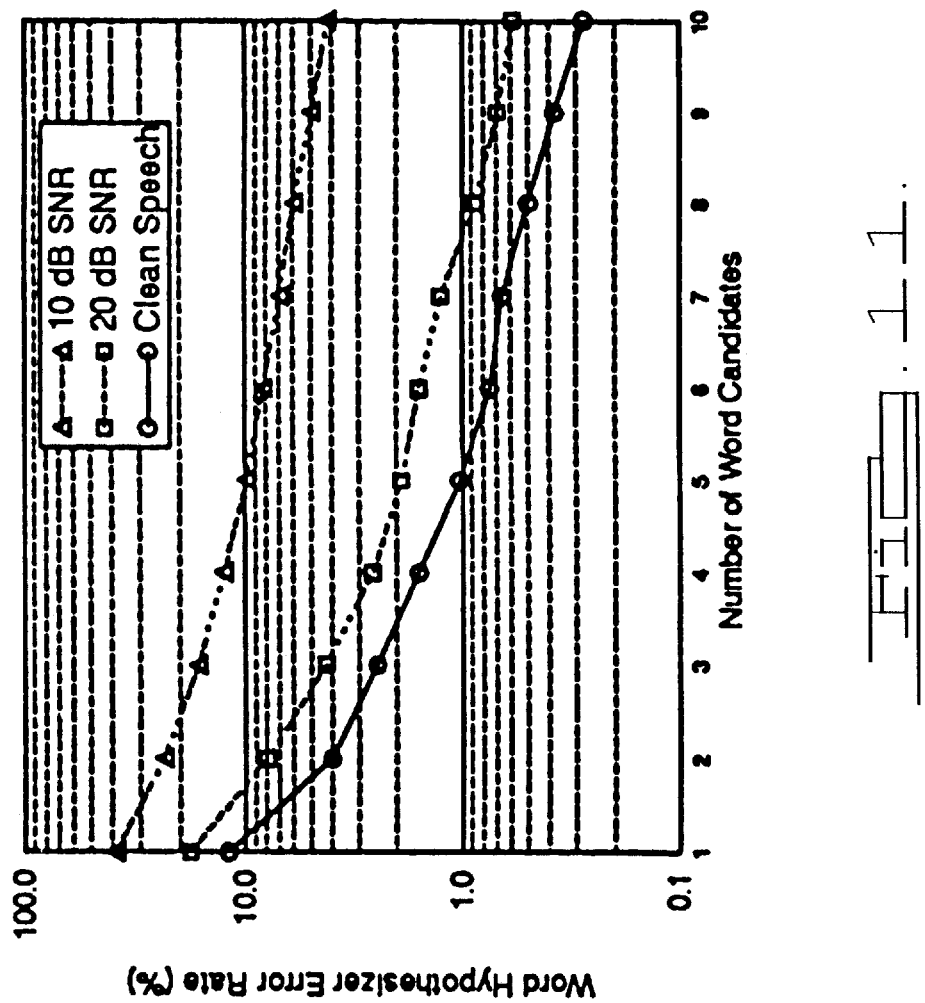
FIG. 11 is a graph depicting the word hypothesizer error rate versus the number of word candidates.

Experimental error rates for the word hypothesizer's word candidate list are shown in FIG. 11. For clean test speech the correct word is missing from the top 10 word candidates only 0.28% of the time, and from the top 5 word candidates 1.03% of the time.

TABLE 1

| Number of Word Candidates | Net Alignment Time Reduction | System Error Rate | | |
|---|---|---|---|---|
| | | Clean | 20 dB SNR | 10 dB SNR |
| All Words | None | 3.7 | 6.4 | 17.9 |
| Top 10 | 87% | 3.6 | 6.5 | 19.1 |
| Top 5 | 92% | 3.5 | 6.9 | 22.3 |

Error rates for the recognition system as a whole, and net alignment time reduction due to the word hypothesizer, are shown in Table 1. The system error rate is shown for three test speech conditions (i.e., clean, 20 dB and 10 dB SNR exhibition hall noise). Limiting the recognizer's reference set to the top 10 or 5 word candidates did not produce a significant change to error rate for clean speech (p >0.4) or 20 dB SNR noisy speech (p >0.1) by McNemar's test.

The measured time for the alignment portion of the matching for the 100 word task (independent of fixed overhead for analysis) was 5.4 seconds per test word for the template-based procedure and 0.13 seconds per test word for the word hypothesizer. When the word hypothesizer was combined with the template-based recognizer, use of 10 word candidates reduced the total alignment computation time to 0.40 seconds per word (92% reduction).

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A word hypothesizer for processing an input speech utterance in a speech recognition system comprising:

a phoneme model database for storing phoneme model speech data corresponding to a plurality of phonemes;

a phoneme similarity module coupled to said phoneme model database and receptive of said input speech utterance for producing phoneme similarity data indicative of the correlation between said input speech utterance and said phoneme model speech data with respect to time;

a word prototype database for storing word prototype data corresponding to a plurality of predetermined words, the word prototype data representing said predetermined words as a plurality of targets each target corresponding to a different phoneme, wherein each of said plurality of targets represents the occurrence of at least one phoneme similarity peak as compared with a predefined speech database;

a prototype comparator coupled to said word prototype database and to said phoneme similarity module for correlating said phoneme similarity data and said word prototype data to select at least one of said predetermined words as a word hypothesis for said input speech utterance.

2. A method for hypothesizing word candidates based on an input speech utterance for use in a speech recognition system comprising:

(a) providing a phoneme template representing a database of calibration speech;

(b) comparing said input speech utterance with said phoneme template to produce speaker phoneme similarity data as a function of time;

(c) processing said speaker phoneme similarity data to extract speech regions that exceed a predetermined similarity threshold, thereby defining extracted speaker features;

(d) storing word prototype data corresponding to a plurality of predetermined words, the word prototype data representing said predetermined words as a plurality of targets each target corresponding to a different phoneme, wherein each of said plurality of targets represents the occurrence of at least one phoneme similarity peak as compared with a predefined speech database;

(e) aligning the extracted speaker features and word prototype data and selecting at least one word from said word prototype data which achieves a predetermined degree of correlation between the extracted speaker features and said word prototype data.

3. The method of claim 2 wherein the step of aligning the extracted speaker features and word prototype data, further including:

selecting the word prototype data that corresponds to said extracted speaker features;

building an alignment structure that defines a set of aligned high similarity regions between said extracted speaker features and said selected word prototype data and defines data indicative of degree of correlation for each of said aligned regions.

4. The method of claim 3 further including:

normalizing said selected word prototype data to same time scale as said corresponding extracted speaker features.

5. The method of claim 3 further including:

performing linear regression between said selected word prototype data and said corresponding extracted speaker features.

6. The method of claim 3 further including:

normalizing said selected word prototype data to same time scale as said corresponding extracted speaker features; and performing linear regression between said selected word prototype data and said corresponding extracted speaker features.

7. The method of claim 2 further comprising the step of:

determining center height of speaker features.

8. The method of claim 2 further comprising the step of:

determining center frame of speaker features.

9. The method of claim 2 further comprising the step of:

determining left boundary frame of speaker features.

10. The method of claim 2 further comprising the step of:

determining right boundary frame of speaker features.

11. A method for hypothesizing word candidates based on an input speech utterance for use in a speech recognition system comprising:

providing a phoneme template representing a database of calibration speech;

comparing said input speech utterance of said speaker with said phoneme template to produce speaker phoneme similarity data as a function of time;

processing said speaker phoneme similarity data to extract speaker features that exceed a predetermined similarity threshold;

storing word prototype data corresponding to a plurality of predetermined words, the word prototype data representing said predetermined words as a plurality of targets each corresponding to a different phoneme, wherein each of said targets represents the occurrence of at least one phoneme similarity region as compared with a predefined speech database;

iteratively performing the steps:

(a) determining speech match characteristics;

(b) selecting said extracted speaker features which satisfy said speech match characteristics;

(c) aligning the selected speaker features and word prototype data and selecting at least one from said word prototype data which achieves a predetermined degree of correlation between said selected speaker features and said word prototype data; and storing said selected word prototype data as hypothesized word candidates of said input speech utterance.

12. The method of claim 11 wherein the step of aligning the selected speaker features and word prototype data, further including:

selecting the word prototype data that corresponds to said selected speaker features;

building an alignment structure that defines a set of aligned high similarity regions between said extracted speaker features and said selected word prototype data and defines data indicative of degree of correlation for each of said aligned regions.

13. The method of claim 12 further including:

normalizing said selected word prototype data to same time scale as said corresponding selected speaker features.

14. The method of claim 12 further including:

performing linear regression between said selected word prototype data and said corresponding selected speaker features.

15. The method of claim 12 further including:

normalizing said selected word prototype data to same time scale as said corresponding extracted speaker features; and performing linear regression between said selected word prototype data and said corresponding extracted speaker features.

16. The method of claim 11 further comprising the step of:

determining center height of speaker features.

17. The method of claim 11 further comprising the step of:

determining center frame of speaker features.

18. The method of claim 11 further comprising the step of:

determining left boundary frame of speaker features.

19. The method of claim 11 further comprising the step of:

determining right boundary frame of speaker features.

20. The method of claim 11 further including:

normalizing said selected word prototype data to same time scale as said corresponding extracted speaker features; and performing linear regression between said selected word prototype data and said corresponding extracted speaker features.

21. A method for aligning a first speech utterance and second speech utterance to determine a degree of correlation between said first and second speech utterance comprising:

providing a phoneme template representing a database of calibration speech;

for said first speech utterance, comparing the first speech utterance with said phoneme template to produce first speech utterance similarity data as a function of time;

for said second speech utterance, comparing the second speech utterance with said phoneme template to produce a second speech utterance similarity data as a function of time;

aligning regions of the first speech utterance phoneme similarity data and the second speech utterance phoneme similarity data that achieve a predetermined degree of correlation; and building an alignment structure that defines a set of aligned high similarity regions between said first speech utterance and said second speech utterance, and defines data indicative of degree of correlation for each of said aligned regions.

22. The method of claim 21 further including:

normalizing said first speech utterance phoneme similarity data to same time scale as said second speech utterance phoneme similarity data.

23. The method of claim 21 further including:

performing linear regression between said first speech utterance phoneme similarity data and said second speech utterance phoneme similarity data.

* * * * *